July 23, 1957    J. WHITCROFT    2,800,598
CIRCUIT ARRANGEMENT FOR DYNAMO-ELECTRIC MACHINES
HAVING A ROTATING CONTACT SURFACE
Filed Feb. 8, 1955    3 Sheets-Sheet 1

INVENTOR
JOHN WHITCROFT
By
ATTORNEY

FIG.2d1.

United States Patent Office 2,800,598
Patented July 23, 1957

2,800,598

CIRCUIT ARRANGEMENT FOR DYNAMO-ELECTRIC MACHINES HAVING A ROTATING CONTACT SURFACE

John Whitcroft, Welton, near Daventry, England, assignor to The British Thomson-Houston Company Limited, a British company Application February 8, 1955, Serial No. 486,857

Claims priority, application Great Britain February 14, 1954

10 Claims. (Cl. 310—220)

This invention relates to dynamo-electric machines having rotating contact devices, such as slip rings or commutators, and aims at providing a means for ensuring satisfactory operation of the contact devices, and thereby of the machine, for a longer period than has been possible heretofore while at the same time reducing the maintenance work.

The problem of commutation in electrical machines has been the subject of many investigations resulting in the introduction of various aids, such as resistance connections or high contact drop brushes, the object of which has been to suppress or limit the possible surge of current in the commutating zone. It has been found that the surge of current to which faulty commutation is due may be caused by one or more of the following three phenomena:

(a) Potential difference between commutator bars, considering the path: commutator bar—brush face—adjacent commutator bar. This surge is present in varying degree on many electrical machines, its existence has been recognised and measures such as those mentioned above, have been taken to limit it.

(b) Reactance voltage generated by the compulsory change of the current in coils undergoing commutation.

(c) Sudden release of energy stored in an inductive circuit, such as a series field winding, when the contact resistance between one of the brushes and the commutator face is suddenly changed. This surge occurs when the commutator surface is not in a good mechanical condition, or when its contact characteristic is not uniform.

In considering the latter phenomenon it should be appreciated that in many instances the inductance of the circuit connected to the brushes is considerable and when it carries comparatively heavy current the stored energy is high. Thus if the path of high conductivity is momentarily opened between the brush and the rotating contact means, that is the commutator or slip ring face, a high energy arc is produced which may cause further deterioration of the contacting surfaces, so that the effect is cumulative.

The purpose of the present invention is to reduce or eliminate the amount of this energy which may be discharged at the contacting surfaces and thereby to increase the useful life of the rotating contact means and its brushes.

While the present invention is chiefly concerned with combating the phenomenon described under (c) above, by its very nature it has a beneficial effect on the phenomena described under (a) and (b).

In so far as the phenomenon (c) is concerned, dynamo-electric machines having rotating contact devices, can be classified into two groups from the commutation point of view. These are as follows:

A. Those machines which have their inductive windings physically connected to electrical brushes, and which are closely coupled magnetically to a low impedance source, or which are connected by two or more terminals to a low impedance source.

B. Those machines which have their inductive windings physically connected to electrical brushes, but which are not closely coupled to a low impedance source, nor connected by two or more terminals to a low impedance source.

The invention will be better understood by reference to the accompanying drawings in which.

Figure 1A:
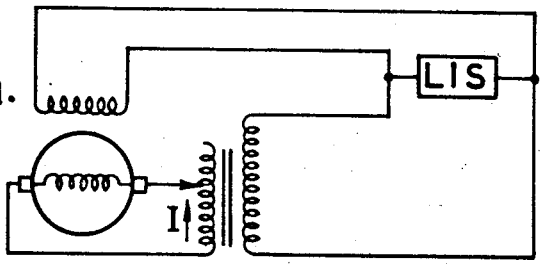
Figs. 1a and 1b illustrate two examples of conventional machines of the Class A above mentioned.
Figure 1B:
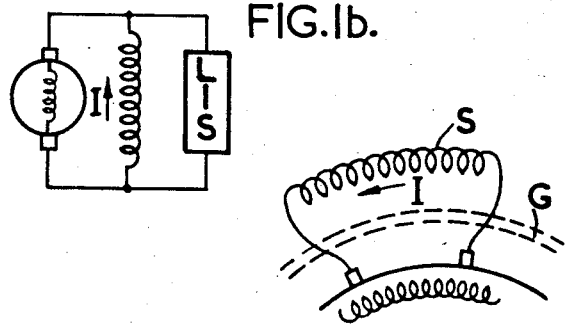
Figure 1C:
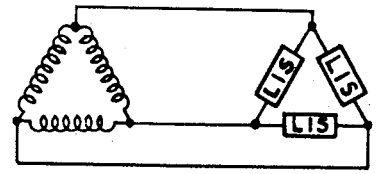
Figs. 1c, 1d and 1e illustrate three examples of conventional machines of the Class B above mentioned.
Figure 1D:
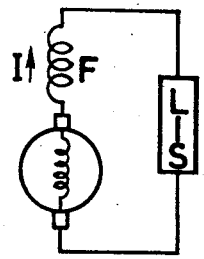
Figure 1E:
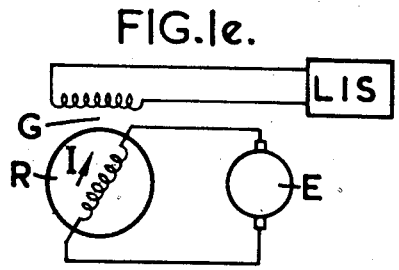
Figure 2C:
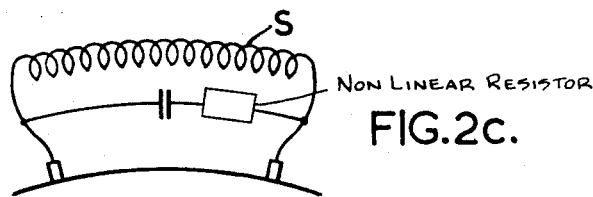
Fig. 2c shows a secondary phase winding of a machine of the type of Fig. 1c provided with the improved circuit arrangement of the present invention.
Figure 2D:
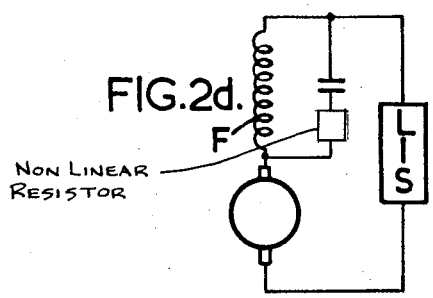
Figure 2E:
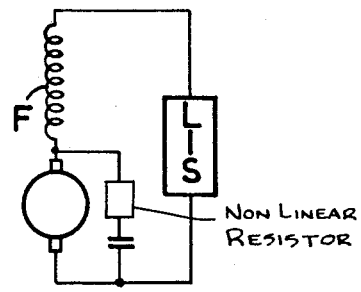
Figure 2E:
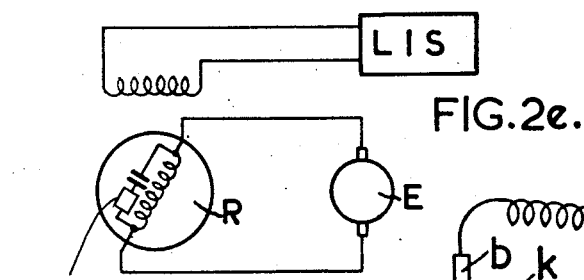
Figure 3A:
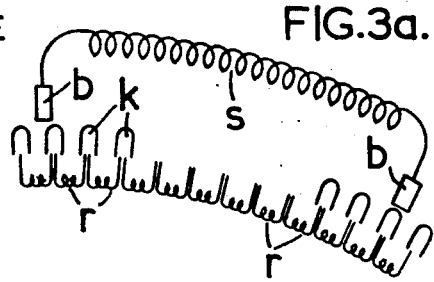
Figure 3B:
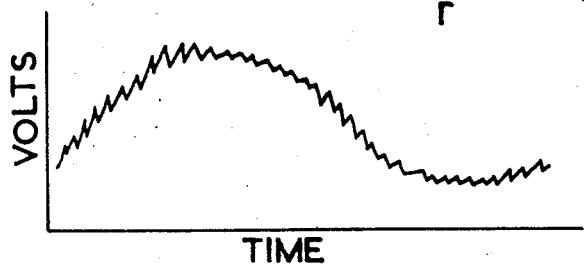
Figure 4:
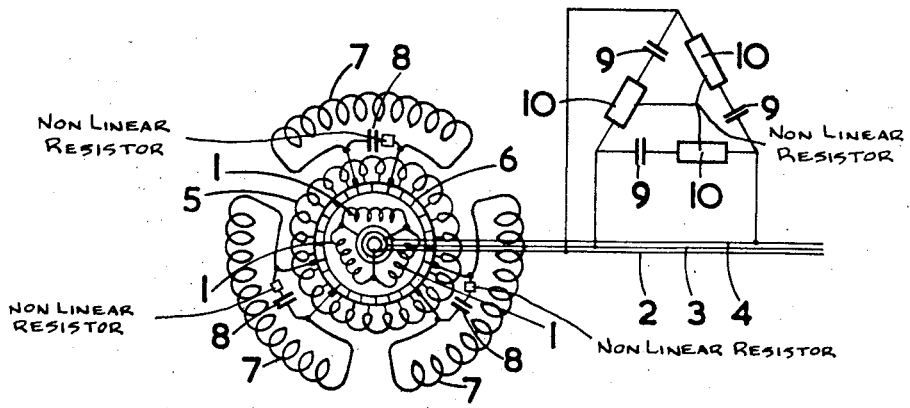

Figs. 2d and 2d1 show the present invention as applied to machines of the type illustrated in Fig. 1d;

Fig. 2e shows the invention applied to a machine of the type illustrated in Fig. 1e;

Fig. 3a shows in greater detail a commutating system connected to the winding of a machine of Class B, where no compoles are used;

Fig. 3b shows a voltage diagram of such a machine;

Fig. 4 shows the invention applied to a machine of the Schrage type; and

Figure 5:
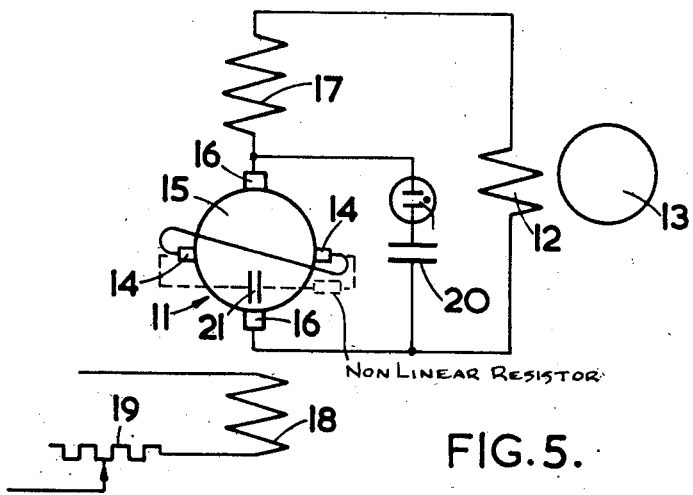

Fig. 5 shows the invention applied to an armature reaction machine such as an amplidyne.

Examples of Class A are shown in Figs. 1a and 1b respectively, Fig. 1a illustrating a stator fed, shunt type alternating current motor of which one phase only is shown for simplicity, and Fig. 1b illustrating a shunt type direct current motor.

It will be seen that normally a current I flows in the inductive windings of these machines. If this current is temporarily arrested, the low impedance source LIS serves as a damping means so that no excessive transient voltage can result, this voltage being damped by the low impedance source. These low impedance sources are formed in Fig. 1a by means of magnetic coupling, and in Fig. 1b by direct connection.

Examples of machines of Class B are illustrated diagrammatically in Figs. 1c, 1d and 1e. Fig. 1c shows a portion of a Schrage motor with current I flowing through a phase winding S of its stator. Then if on account of physical or electrical irregularity at the commutator, the current I is arrested in the secondary, that is the stator winding, the transient voltage thus generated cannot be effectively damped by low impedances LIS since the only coupling between it and the low impedance sources is via the air gap G, which forms a high reluctance path. The voltage will, therefore, rise until it reaches such a magnitude as to restore the interrupted flow of current, and this is likely to produce an arc with associated matter transfer at the contact between the brush and the commutator.

Fig. 1d shows a series motor in which a field winding F carrying the current I is connected to a low impedance source by only one lead, the other end of the winding being connected through the armature. Therefore a transient in the field winding caused by current interruption at the commutator will rise until it produces an arc as described with reference to Fig. 1c.

Fig. 1e shows the rotor R of a turbo-alternator fed from an exciter machine E. In this case a transient in the rotor winding of the alternator will produce a heavy current through the sliprings of the alternator rotor and the commutator of the exciter with detrimental results as described above. It will be appreciated that the coupling between the rotor windings and the low impedance source LIS, is inadequate because of the presence of the air gap G as in Fig. 1c.

According to the invention a bypass for the current surges is provided by capacitors, and the manners in which they should be connected to obviate surges in the cases 1c, 1d, 1e are diagrammatically indicated in Figs. 2c, 2d, 2d1 and 2e respectively. In Figs. 2c, 2d and 2e a capacitor is connected in shunt to the winding which may produce surges, and in Fig. 2d1 a capacitor is connected in series, to bypass the surge energy, or as in the latter case to divert it to the low impedance which is already connected to the system.

It can also be shown that the invention has a beneficial effect on the phenomena described under (a) and (b).

While complete knowledge of the mechanism of current conduction in a sliding contact, especially that of carbon brushes on metal is not available yet, the safe limits of operation of such contacts has to be established by experiments. It has been found, however, that the introduction of a capacitance bypass circuit according to the invention permits these limits to be extended, and this is a major advantage and secondary feature of the invention.

Fig. 3a diagrammatically represents the commutating system of a machine in Class B, and of a type where normal commutating aids such as compoles cannot be used, such as a Schrage machine, b, k, r, and s denoting the brushes, commutator segments, regulating winding and secondary winding respectively. Fig. 3b shows the voltage waveform of this machine, which comprises a fundamental wave at the operating frequency (which could be zero), and a superimposed wave oscillating at the frequency of commutation. This phenomenon of voltage ripple is recognised in all commutating systems and is attributed to various causes.

Irrespective of the cause, this high frequency voltage ripple is an indication of high current density concentrations on small areas, especially towards the end of the period during which the brush is on each commutator segment.

It has been found that the invention reduces this current density concentration and the sparking associated therewith.

As will be apparent the present invention can be usefully applied to alternating current or direct current dynamo-electric machines having any type of rotating contact means such as commutators or collectors.

It has been known up to now to connect capacitors to the brushes and also to the windings of dynamo-electric machines for the purpose of radio interference suppression, and for power factor improvement. However, for interference suppression the capacitance value is comparatively small, say from a fraction of a microfarad up to four microfarads, and power factor improvement which serves in connection with alternating current circuits only, requires a current flow through the capacitor which is always substantial, even during normal operating conditions of the dynamo-electric machine.

In contradistinction, the effect aimed at by the present invention, requires that the value of the capacitor connected to the contact means and associated with the normal operating voltage across the brushes is much greater than that required for radio interference suppression, and for machines of the size in which the phenomenon is likely to be serious the value may be of the order of at least thirty microfarads.

Furthermore, the circuit according to the invention including the capacitors should be so designed as to prevent undesirable current flow when the operating conditions of the motor and particularly of the contact surfaces are normal. Resistors or switching means in the bypass circuit may serve to ensure such current limitation.

The capacitor may be used in conjunction with a device which isolates it, or tends to isolate it, when the voltage is low, and brings it into effective operation when the voltage is high. For instance a non-linear resistance, having a suitable characteristic, so that the rate of current increase surpasses the rate of voltage increase, when connected in series with the capacitor would partially isolate it at low voltage, but would render it almost completely effective at high voltage.

Thus from one general aspect, the object of the invention can be achieved by a dynamo-electric machine of direct current or alternating current type having a rotating contact means contacted by brushes and a capacitor or a capacitor and resistance connected to the brushes or to a winding of the machine to form a bypass circuit which passes negligible or no current under normal operating conditions, but passes a substantial amount of current when the voltage drop at the brushes rises to a predetermined value, due for instance to irregularities in the contact surface.

The capacitor for the bypass circuit can be of any conventional construction and of a type best suited to the operating conditions. If desired the capacitor may be coupled to the brushes by means of a step-up transformer inserted between the contact device and the capacitor.

More details of the invention will be apparent from the following description referring to the accompanying drawings which illustrate diagrammatically and by way of example preferred embodiments of the invention, and in which:

Fig. 4 shows a motor of the Schrage type which has bypass circuits according to the invention connected to the secondary windings and may also have such bypass circuits connected to the primary windings if required.

Fig. 5 shows a dynamo-electric machine of the armature reaction type serving as a generator and having a bypass circuit according to the invention connected to its secondary brushes.

According to Fig. 4 the rotor carries for instance three-phase primary windings 1 connected via slip rings to conductors 2, 3, 4 of a supply circuit, and as usual for such motors a regulating winding 5 which has suitable points connected to the segments of a commutator 6. Each one of three secondary windings 7 of the stator has its ends connected to brushes which co-operate with the commutator. As is well known the brushes of each pair associated with a secondary winding can be displaced in relation to each other and the axes of the brush pairs can be shifted by conventional means which are not shown, as they form no part of this invention. When the brushes are on the same commutator segment, the secondary winding is virtually short-circuited and when the brushes are separated the voltage applied to the secondary winding depends on the amount of brush separation. Thus torque and speed control are possible, while shift of the axes of the brush pairs permits control of the power factor of the machine. In accordance with the invention bypass circuits comprising capacitors 8 are connected to the ends of windings 7 that is between the commutator brushes so as to reduce the wear of these brushes and of the commutator surface as before described. Furthermore bypass circuits comprising capacitors 9 and non-linear resistances 10 are connected between the brushes co-operating with the slip rings so as to prevent premature deterioration of the respective contact surfaces. For the sake of simplicity these bypass circuits are shown as connected between the supply conductors 2, 3, 4.

According to Fig. 5 a dynamo-electric machine 11 of the armature reaction excitation or amplidyne type is arranged to operate as generator supplying the field winding 12 of a motor 13. As is known primary brushes 14 co-operating with a commutator 15 are short-circuited to establish a primary current for producing the armature reaction flux, while secondary brushes 16 electrically displaced from the primary brushes substantially by 90°, are connected to the load circuit, in this case the field winding 12. A compensating field winding 17 is provided in series with the load to oppose the secondary armature reaction. A control field winding 18 is supplied via a regulating resistance 19 as is known in the art. According to the invention a bypass circuit including a capacitor 20 is connected to the secondary brushes for the purpose of preventing excessive contact wear as before mentioned and a capacitance 21 could also be connected between the primary brushes 14 if desired.

It will be understood that although the invention is applicable to all types of dynamo-electric machines, it is particularly applicable to rotor fed alternating current commutator machines.

It is known in the art that an important feature of servo mechanisms, especially those with electronic control, is a quick response characteristic to the load changes. This may impose difficult commutating conditions, especially on motors with high inertia, and when rapid change of speed is required.

Also an additional capacitance in parallel with such motors may alter the time constant, and delay the speed of response.

Under such circumstances the bypass circuit according to the invention may require a modification of the added impedance by the inclusion of a series resistance or inductance, or a band-pass filter, designed to separate the commutation frequencies from the frequencies of normal operation. An electronic switching device such as a grid controlled valve or pair of valves in parallel reverse connection may be included in the bypass circuit to allow current flow under predetermined surge conditions only. Other variations are possible without departure from the scope of this invention as defined by the appended claims.

What I claim is:

1. A dynamo-electric machine having a rotating contact surface, a winding connected to at least one brush contacting said surface, a capacitor connected between the ends of said winding, and connected in series with the capacitor a voltage responsive electric device which reduces its initial high resistance to current conduction with rising voltage, such device being practically non-conductive under normal operating conditions of the machine, but current conductive when subjected to a voltage surge such as may occur due to an undesirable condition of the said rotating contact surface, thereby to release and divert through the capacitor surge energy from the said winding.

2. A machine as described in claim 1 wherein the value of the capacitor is at least of the order of 30 microfarads.

3. A dynamo-electric machine having a rotating contact surface, a winding connected to at least two brushes contacting said surface, a capacitor connected between said two brushes and connected in series with the capacitor, a voltage responsive electric device having a high initial resistance so as to be practically non-conductive under normal operating conditions of the machine, but materially reducing this resistance to become conductive when subjected to a voltage surge as may occur due to an undesirable condition of said rotating contact surface, thereby to release and divert through the capacitor energy from the said winding under said condition.

4. A dynamo-electric machine having a rotating contact surface, a winding connected to at least one brush contacting said surface, a series arrangement of a capacitor and a non-linear resistor connected between the ends of said winding, said resistor being practically non-conductive under normal operating conditions of the machine and becoming conductive at a voltage surge such as may be due to an undesirable condition of said rotating surface, thereby to release and divert through the capacitor energy from said winding under said condition.

5. A dynamo-electric machine having a rotating contact surface, a winding connected to at least two brushes contacting said surface, a series circuit including a capacitor and a non-linear resistor connected between said two brushes, said resistor being practically non-conductive under normal operating conditions of the machine yet becoming conductive at a predetermined voltage rise as may be caused by an undesirable condition of said rotating contact surface thereby to release and divert through the capacitor energy from said winding under said condition.

6. A dynamo-electric machine having a rotating contact surface, a winding connected to at least one brush contacting said surface, a series circuit including a capacitor and an electronic tube connected across said winding, said tube being practically non-conductive under normal operating conditions of the machine yet becoming conductive at a voltage rise as may be caused by an undesirable condition of said rotating contact surface thereby to release and divert through the capacitor energy from said winding under said condition.

7. A dynamo-electric machine having a rotating contact surface, a winding connected to two brushes contacting said surface, a series circuit including a capacitor and an electronic tube connected between the two brushes contacting said rotating surface, said tube being practically non-conductive under normal operating conditions of the machine yet conducting at a higher voltage difference between its electrodes as may be caused by an undesirable condition of said rotating contact surface, thereby to release and divert through the capacitor energy from said winding under said condition.

8. A Schrage motor having a capacitor and in series relationship therewith, an electric device connected between each pair of its commutator brushes, said device being voltage responsive and having a high initial resistance to current conduction which is substantially reduced when the voltage across it increases to a predetermined value as may be caused by an undesirable condition of said rotating surface, thereby to release and divert through the capacitor energy from said winding under said condition.

9. A Schrage motor as claimed in claim 7 wherein there are connected between adjacent slip-ring brushes a capacitor and in series relationship therewith, a voltage responsive electric device which passes current at surge conditions only as may be caused by a roughness of the slip-ring surface.

10. A direct current dynamo-electric machine of the armature reaction excitation type having connected between its secondary brushes, a series circuit comprising a capacitor and a voltage responsive electric device the latter changing an initial high value of resistance to a much lower value, at a predetermined higher voltage, so as to release and divert through the capacitor surge energy from the machine winding which may appear for instance when an undesirable condition of the rotating contact surface engaged by said brushes occurs.

References Cited in the file of this patent

UNITED STATES PATENTS

| | | |
|---|---|---|
| 1,966,077 | Nyman | July 10, 1934 |
| 2,274,378 | Ogden | Feb. 24, 1942 |
| 2,465,668 | Thielers | Mar. 29, 1949 |

FOREIGN PATENTS

| | | |
|---|---|---|
| 14,390 | Great Britain | of 1913 |
| 256,164 | Germany | Jan. 21, 1913 |